United States Patent [19]

Van Leunen

[11] Patent Number: 4,712,011

[45] Date of Patent: Dec. 8, 1987

[54] X-RAY IMAGE INTENSIFIER TUBE INCLUDING A LUMINESCENT LAYER WHICH ABSORBS SECONDARY RADIATION

[75] Inventor: Johannes A. J. Van Leunen, Heerlen, Netherlands

[73] Assignee: U.S. Philips Corporation, New York, N.Y.

[21] Appl. No.: 847,808

[22] Filed: Apr. 3, 1986

[30] Foreign Application Priority Data

Apr. 3, 1985 [NL] Netherlands ........................ 8500981

[51] Int. Cl.$^4$ ................................................ G01T 1/20

[52] U.S. Cl. ............................ 250/361 R; 250/487.1; 250/483.1; 378/156

[58] Field of Search ............ 250/361 R, 483.1, 484.1, 250/486.1, 487.1; 378/145, 140, 44, 156

[56] References Cited

U.S. PATENT DOCUMENTS 3,872,309 12/1975 DeBelder et al. ................ 250/483.1
4,054,799 10/1977 Wolfe et al. ..................... 250/486.1
4,393,512 7/1983 Wong ................................... 378/44
4,490,615 12/1984 Riihimäki et al. ................ 350/483.1

*Primary Examiner*—Carolyn E. Fields
*Assistant Examiner*—Richard Hanig
*Attorney, Agent, or Firm*—F. Brice Faller

[57] ABSTRACT

An X-ray image intensifier tube which includes a luminescent layer with an absorption material having a high absorption for secondary X-rays which are generated in the original luminescent material and which are intercepted to only a very small extent by the original luminescent material. The absorption material may be included in the layer of luminescent material in homogeneous form as well as in recesses in said layer. In addition to improved resolution, a higher efficiency can be achieved by ensuring that, upon interception of the secondary radiation, the absorption material generates luminescent or secondary radiation which is intercepted by the original luminescent material.

20 Claims, 4 Drawing Figures a b c

X-RAY IMAGE INTENSIFIER TUBE INCLUDING A LUMINESCENT LAYER WHICH ABSORBS SECONDARY RADIATION

BACKGROUND OF THE INVENTION

The invention relates to an X-ray image intensifier tube which includes an entrance screen with a layer of luminescent material provided on a substrate as well as a photocathode, and also includes an electron-optical system for imaging photoelectrons, to be emitted by the photocathode, on an exit screen of the tube.

An X-ray image intensifier tube of this kind is known from U.S. Pat. No. 3,825,763. The entrance screen of an X-ray image intensifier tube described therein includes a layer of luminescent material which consists mainly of CsI whereto an activator is added, for example from 0.1 to 1.0 percent by weight of Na or Ti.

X-rays intercepted by this luminescent layer are at least partly converted into luminescent light. The luminescent light releases photoelectrons from a photocathode. The photoelectrons are accelerated and imaged on an exit window where they form a light image in the customary manner. In such tubes a comparatively high brightness intensification is obtained notably by acceleration of the photoelectrons to, for example from 25 to 30 kV. In other types of X-ray image intensifier tube the brightness intensification is notably achieved by photoelectron multiplication, for example by means of a channel plate multiplier.

In known tubes foggy images are formed because secondary X-rays which are released from the luminescent material and which are not readily absorbed by the luminescent material can spread across a comparatively large part of the layer of luminescent material and generate luminescent light as yet. On the other hand, due to the small probability of interception of this radiation by the luminescent material, this secondary radiation contributes only little to the production of luminescent light for which the photocathode is sensitive. Consequently, part of the radiation energy is lost for the imaging process.

SUMMARY OF THE INVENTION

It is the object of the invention to eliminate these drawbacks at least partly; to achieve this, an X-ray image intensifier tube of the kind set forth in accordance with the invention is characterized in that the layer of luminescent material includes an absorption material which contains an element having a comparatively high absorption for secondary X-rays emitted by the luminescent material.

Because a luminescent layer in accordance with the invention includes a material in which the secondary radiation is absorbed to a comparatively high degree, the occurrence of foggy images is reduced. The absorption material in a preferred embodiment contains a luminescent material which is sensitive to the secondary X-rays or which converts these rays into radiation for which the original luminescent material is sensitive. Thus, in addition to the reduction of fogginess, the radiation efficiency of the luminescent layer can also be enhanced.

In a preferred embodiment, the absorption material contains up to 5 percent by weight of an element having an absorption edge for a wavelength which is only slightly longer than the wavelength of the characteristic radiation of an element having a lowest atomic number of the original luminescent material. For a luminescent layer consisting of CsI, use can then be made of, for example, tellurium (52), antimony (51) or tin (50), for the iodine (53) radiation.

The absorption material in a further preferred embodiment contains an element having an atomic number which is substantially higher than that of the element of the original luminescent material which emits secondary radiation. To the CsI luminescent material there may then be added up to 5 percent by weight of, for example thallium (81), lead (82) or bismuth (83). The use of thallium, to be added, for example in the form of ThI, offers the advantage that this material can also act as an activator. In general it is advantageous to add the desired elements in the form of iodides, the more so because the CsI is least disturbed thereby. Therefore, all elements wherefrom iodides can be formed and which do not contaminate the CsI are actually suitable to be added. This holds good for elements having a low atomic number as well as for elements having a comparatively high atomic number.

Instead of the described addition of elements which are adapted to the secondary radiation and which are luminescent or not themselves, in a preferred embodiment an absorption material is added in the form of a luminescent material which is at least reasonably sensitive to the relevant secondary radiation of approximately 30 KeV. In this respect a choice can be made from inter alia $Gd_2O_2S$, $Y_2O_2S$, $LaO_2S$, CaWO, CsBr, BaFCl, $BaSO_4$ and InCdS. Again an amount of up to 5 mol. percent of these materials is added.

In a further preferred embodiment which includes a layer of luminescent material having a columnar structure, the absorption material is accommodated mainly in spaces between the columns. In a preferred embodiment utilising a structured substrate, the absorption material is accommodated mainly in raised portions on the substrate; when use is made of an intermediate layer between the luminescent layer and the photocathode, the absorption material can be included mainly in protrusions of this intermediate layer which penetrate into the layer.

In order to prevent contamination of the luminescent layer or the photocathode, grains of absorption material may be encapsulated in an envelope made of, for example a plastics such as parylene. Such a capsule is preferably constructed so as to be thin, because otherwise the absorption of the layer will deteriorate. When the absorption material is accommodated mainly in empty spaces in the layer, this restriction will be less severe.

DESCRIPTION OF THE PREFERRED EMBODIMENT

Figure 1:
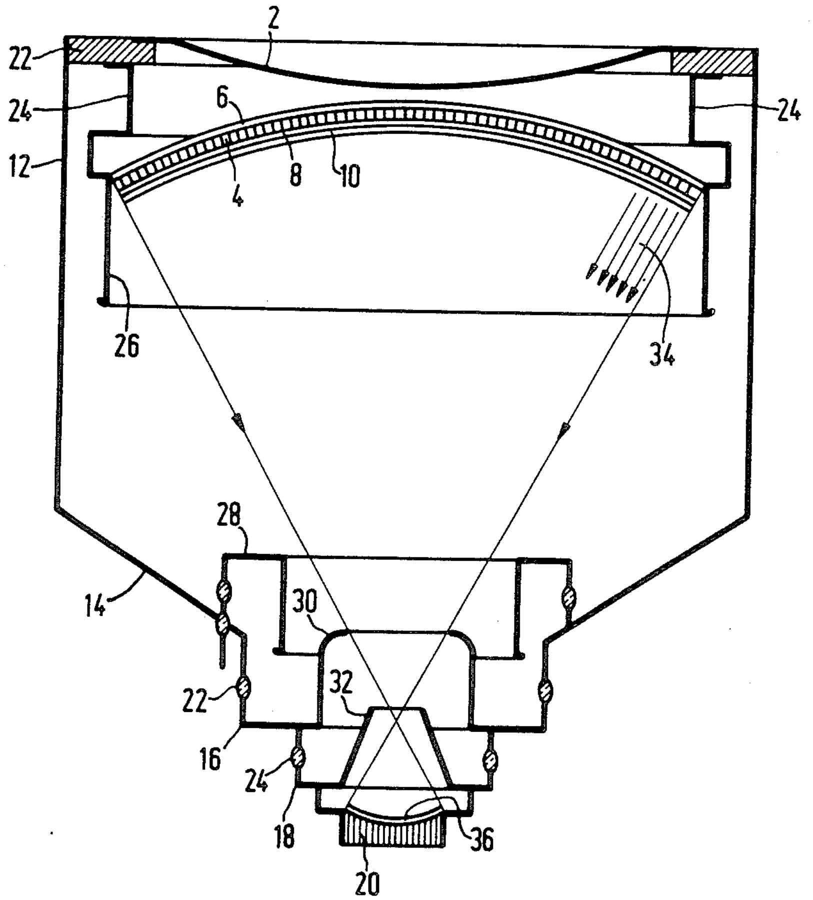
FIG. 1 shows an X-ray image intensifier tube including a luminescent layer provided on a substrate mounted in the tube, FIG. *2a–c* shows some embodiments of luminescent layers provided with an absorption material.
Figure 2:
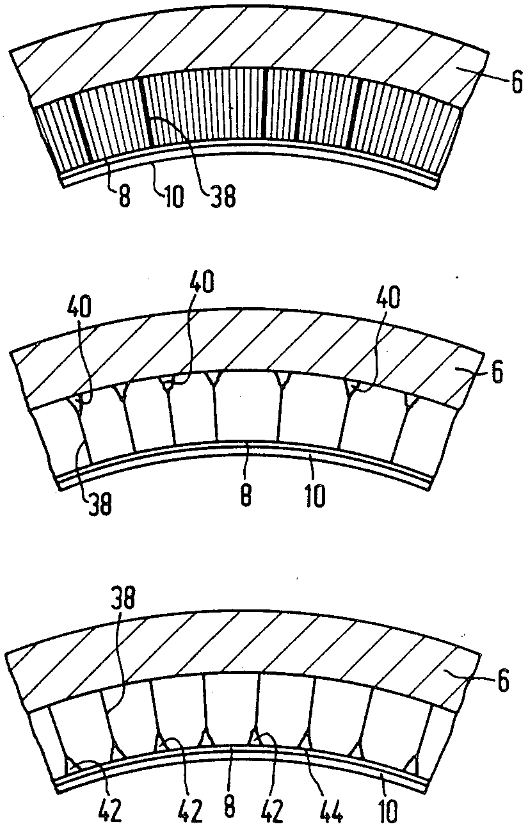

An X-ray image intensifier tube as shown in FIG. 1 includes an entrance window is provided with a vacuum separating foil 2 of a suitable material, for example titanium. A layer of luminescent material 4 is provided on a substrate 6 of, for example aluminium; on the luminescent layer 4 there is provided a photocathode layer 10, possibly in combination with an intermediate separating layer 8. The entrance screen thus constructed is mounted in an evacuated tube whose wall includes, in addition to the entrance window, a cylindrical surface 12 with a tapered portion 14, an intermediate anode carrier 16, an end anode carrier 18 and an exit window 20. The tube is provided at its entrance side with a mounting ring 22 whereto the entrance foil as well as a carrier 24 for the entrance screen are connected. Via an entrance electrode 26 and electrodes 28, 30 and 32, beams of photoelectrons 34 emerging from the photocathode 10 are imaged on a luminescent layer 36 which is preferably provided on the exit screen 20 which consists of, a fibre-optical plate. An electron image thus projected on the exit window generates a light-optical image in the layer of luminescent material; this light-optical image can be studied and recorded from the outside, for which purpose a television camera tube is coupled to the exit window in the usual manner. An absorption material is included in the luminescent layer 4 of the entrance screen as shown in FIG. 2. Such an absorption material can be vapour-deposited simultaneously with the luminescent material (customarily CsI). To this end, use can be made of, a luminescent material which already includes an absorption material. This can be done, when use is made of an activator such as TlI for the absorption material, because for this material the vapour-deposition parameters such as melting temperature, vapour pressure etc. are sufficiently close. In the case of materials which are less similar in this respect, material can be vapour-deposited from a separately arranged holder. If desired, the relative quantity of absorption material can then be varied across the thickness of the layer. In luminescent layers having a structure with a preferred light conduction through the layer such as described in U.S. Pat. No. 3,825,763, it may be advantageous to apply the absorption material more specifically in the space 38 between the mosaic elements. A suitable method in this respect is, to deposit an absorption material in the cracks each time after the formation of the crack structure in a sub-layer during vapour deposition in a plurality of sub-layers, for example by electrically charging the material particles to be deposited. Optical interruptions of the layer of luminescent material in the thickness direction must then be prevented. It may be particularly advantageous to choose such an absorption material that the preferred conduction is enhanced thereby, preferably by intensified reflection. In screens as described in U.S. Pat. No. 3,825,763 the density of the luminescent layer amounts to approximately from 85% to 90% , so that up to 5% of absorption material may indeed be accommodated in the open spaces in the layer.

When use is made of a structured layer as shown in FIG. *2b*, the absorption material is at least also taken up in raised portions 40. Because the cracks in such a structured layer are pronounced, they can also be at least partly filled with absorption material.

The absorption material may alternatively be formed mainly by local projections 42 of the luminescent layer which project from an intermediate layer 44 between the luminescent layer and the photocathode 10. An absorption material such as one with the element Te or Sb or Sn is very attractive because of the absorption edge thereof.

Characteristic radiation generated in Cs is substantially intercepted by the I of the CsI. The characteristic radiation which is generated in I is not intercepted by the Cs but is intercepted to a high degree by an absorption material containing an element such as tellurium, antimony or tin.

A substantial improvement is also obtained by addition, preferably in the form of iodides of, for example, silver, cadmium, indium and also arsenic and calcium for the light elements and, for example also samarium, godolinium, dysprosium, holmium, erbium and thulium in addition to said lead and thallium.

What is claimed is:

1. An X-ray image intensifier tube which includes an entrance screen with a layer of luminescent material provided on a substrate as well as a photocathode, and also includes an electron-optical system for imaging photoelectrons, to be emitted by the photocathode, on an exit screen of the tube, characterized in that the layer of luminescent material includes an absorption material which contains an element having a comparatively high absorption for characteristic X-rays emitted by the luminescent material the absorption material amounting to from approximately 1 to 5 percent by weight of the layer of luminescent material.

2. An X-ray image intensifier tube as claimed in claim 1, characterized in that the absorption material contains an element which has an absorption edge for a wavelength which is only slightly longer than the wavelength of the characteristic radiation of an element having a lowest atomic number of the luminescent material.

3. An X-ray image intensifier tube as claimed in claim 1, characterized in that the absorption material contains an element having an atomic number which is considerably higher than the atomic number of an element of the luminescent material emitting characteristic X-rays which are not intercepted by the original luminescent material.

4. An X-ray image intensifier tube as claimed in claim 3, characterized in that the luminescent material is formed mainly by CsI, the absorption material containing one or more of the elements of the group thallium (81), lead (82) and bismuth (83).

5. An X-ray image intensifier tube as claimed in claim 2, characterized in that the luminescent material is formed mainly by CsI, the absorption material containing one or more elements of the group tellurium (52), antimony (51) and tin (50).

6. An X-ray image intensifier tube as claimed in claim 5 characterized in that the absorption material is formed by an iodide which does not disturb the favourable luminescent properties of CsI.

7. An X-ray image intensifier tube as claimed in claim 3, characterized in that the absorption material consists mainly of a luminescent material which is sensitive to the relevant secondary X-rays.

8. An X-ray image intensifier tube as claimed in claim 7, characterized in that the luminescent layer has a structure of columns which are directed transversely to the layer and which are at least partly optically separated from one another, the absorption material being situated mainly in the spaces between the columns.

9. An X-ray image intensifier tube as claimed in claim 8, characterized in that the absorption material is deposited in the form of grains provided with a shielding envelope.

10. An X-ray image intensifier tube as claimed in claim 9, characterized in that the grains are situated mainly in spaces between columns of a structured luminescent layer and are provided with a shielding layer exhibiting increased reflection for luminescent light generated in the layer.

11. An X-ray image intensifier tube as claimed in claim 10, characterized in that the substrate for the luminescent material has a structure which includes raised portions which face the luminescent layer and which are formed at least partly by an absorption material.

12. An X-ray image intensifier tube as claimed in claim 8, characterized in that between the layer of luminescent material and the photocathode there is situated an intermediate layer, at least projections thereof which penetrate the spaces between the columns containing an absorption material.

13. An X-ray image intensifier tube as claimed in claim 1, characterized in that the luminescent material is formed mainly by CsI, the absorption material containing one or more of the elements of the group thallium (81), lead (82) and bismuth (83).

14. An X-ray image intensifier tube as claimed in claim 1, characterized in that the luminescent material is formed mainly by CsI, the absorption material containing one or more elements of the group tellurium (52), antimony (51) or tin (50).

15. An X-ray image intensifier tube as claimed in claim 1, characterized in that the absorption material is formed by an iodide which does not disturb the favourable luminescent properties of CsI.

16. An X-ray image intensifier tube as claimed in claim 1, characterized in that the absorption material consists mainly of a luminesent material which is sensitive to the relevant secondary X-rays.

17. An X-ray image intensifier tube as claimed in claim 1, characterized in that the luminescent layer has a structure of columns which are directed transversely of the layer and which are at least partly optically separated from one another, the absorption material being situated mainly in the spaces between the columns.

18. An X-ray image intensifier tube as claimed in claim 1, characterized in that the absorption material is deposited in the form of grains provided with a shielding envelope.

19. An X-ray image intensifier tube as claimed in claim 18, characterized in that the grains are situated mainly in spaces between columns of a structured luminescent layer and are provided with a shielding layer exhibiting increased reflection for luminescent light generated in the layer.

20. An X-ray image intensifier tube as claimed in claim 1, characterized in that the substrate for the luminescent material has a structure which includes raised portions which face the luminescent layer and which are formed at least partly by an absorption material.

* * * * *